United States Patent [19]

Hochradel

[11] Patent Number: 4,512,688

[45] Date of Patent: Apr. 23, 1985

[54] PNEUMATIC TUBE SYSTEM WITH CARRIER

[76] Inventor: Hans Hochradel, 89 Minnehaha Blvd., Lake Hiawatha, N.J. 07034

[21] Appl. No.: 461,680

[22] Filed: Jan. 27, 1983

[51] Int. Cl.³ .............................................. B65G 51/32
[52] U.S. Cl. ..................... 406/111; 220/255; 220/335; 406/180; 406/186; 406/190
[58] Field of Search .................. 406/110–112, 406/176, 179, 180, 184–186, 190; 220/255, 335

[56] References Cited

U.S. PATENT DOCUMENTS

| | | |
|---|---|---|
| 242,459 | 6/1881 | Leaycraft . |
| 637,245 | 11/1899 | Gremmels et al. . |
| 642,112 | 1/1900 | Gremmels . |
| 1,826,833 | 10/1931 | Shannehan . |
| 2,747,388 | 5/1956 | Dolar ............................... 220/335 X |
| 2,912,066 | 11/1959 | Ellithorpe ....................... 406/112 X |
| 3,059,875 | 10/1962 | Kelley . |
| 3,080,136 | 3/1963 | Kelley et al. ........................ 406/111 |
| 3,189,297 | 6/1965 | Ellithorpe . |
| 3,231,218 | 1/1966 | Tearne ................................ 406/186 |
| 3,690,593 | 9/1972 | Kettering . |
| 3,940,091 | 2/1976 | Ekama et al. . |
| 4,006,868 | 2/1977 | Hochradel et al. . |
| 4,047,677 | 9/1977 | Hochradel et al. . |
| 4,184,792 | 1/1980 | Turnbo .......................... 406/186 X |
| 4,189,261 | 2/1980 | Kelley et al. . |

FOREIGN PATENT DOCUMENTS 6412515  4/1965  Netherlands ........................ 406/112

Primary Examiner—Jeffrey V. Nase
Assistant Examiner—Daniel R. Edelbrock
Attorney, Agent, or Firm—Bruce M. Collins

[57] ABSTRACT

A pneumatic tube system utilizes a carrier having at least one unlatched door which is biased to a normally open position but held closed by the conduit of the system. Access stations are associated with the conduit and permit the carrier doors to assume an open position upon reaching a station. A pneumatic system which can operate in either a pressure or a vacuum mode is activated automatically at the access station.

14 Claims, 5 Drawing Figures

PNEUMATIC TUBE SYSTEM WITH CARRIER

DETAILED DESCRIPTION

A variety of pneumatic tube systems for the transport of money, documents and the like have been disclosed over the past century. Although differing terminology has been employed, these devices generally have as common components a carrier, tubing or conduit, pneumatic means for creating a pressure and/or vacuum differential, and control means, the nature of which varies with the particular system.

Although earlier carriers such as those of U.S. Pat. Nos. 242,459, 637,245, 642,112 and 1,826,833 were opened manually, subsequent devices such as those of U.S. Pat. Nos. 3,690,593, 3,231,218, 3,059,875 and 2,912,066 have utilized the force of gravity or, more often, spring means for opening or closing. Such springs means either urge the carrier door towards a closed position or urge the door to an open position and incorporate latch means which are activated for release at a sending or receiving station either manually, upon impact or through the action of motors or solenoids; see e.g., U.S. Pat. Nos. 3,189,297, 3,059,875, 3,940,091 and 4,006,868. These mechanisms increase the complexity of such carriers, adding to their cost, weight and impact momentum, thereby requiring stronger mechanical structure and more powerful pneumatic means and increasing the opportunity for mechanical malfunction.

Moreover, in order to switch from pressure to vacuum mode, and vice versa, these systems generally require electromechanical valves, operated by solenoids or motors, and thus incorporate complex circuitry and/or equipment such as those disclosed in U.S. Pat. Nos. 3,080,136 and 4,189,261. Similarly mechanically complex are current access stations or terminals such as those described in U.S. Pat. No. 4,047,677.

As the complexity of these systems has increased, there exists an increased opportunity for misuse of the carriers, not only by trained operators but particularly by the untrained public. In order to adapt systems for public use, as for example in banks and self-service gas stations, captive carriers have been proposed; i.e., carriers which can not be removed from the system. The technical sophistication required of such systems, however, again adds to their cost and detracts from reliability.

The present system utilizes a captive pneumatic tube carrier which automatically opens at the sending and receiving stations (for access to the transported materials) without the use of motors or solenoid drive mechanisms. Moreover, the carrier is free of all door latching mechanisms, sturdy and inexpensive to manufacture. In addition, the pneumatic means of the present invention permit totally static switching from vacuum to pressure; i.e., it requires no electromechanical valves, thereby increasing reliability and reducing cost.

Other features and advantages of the present invention will be apparent from the following description and drawings in which.

Figure 1:
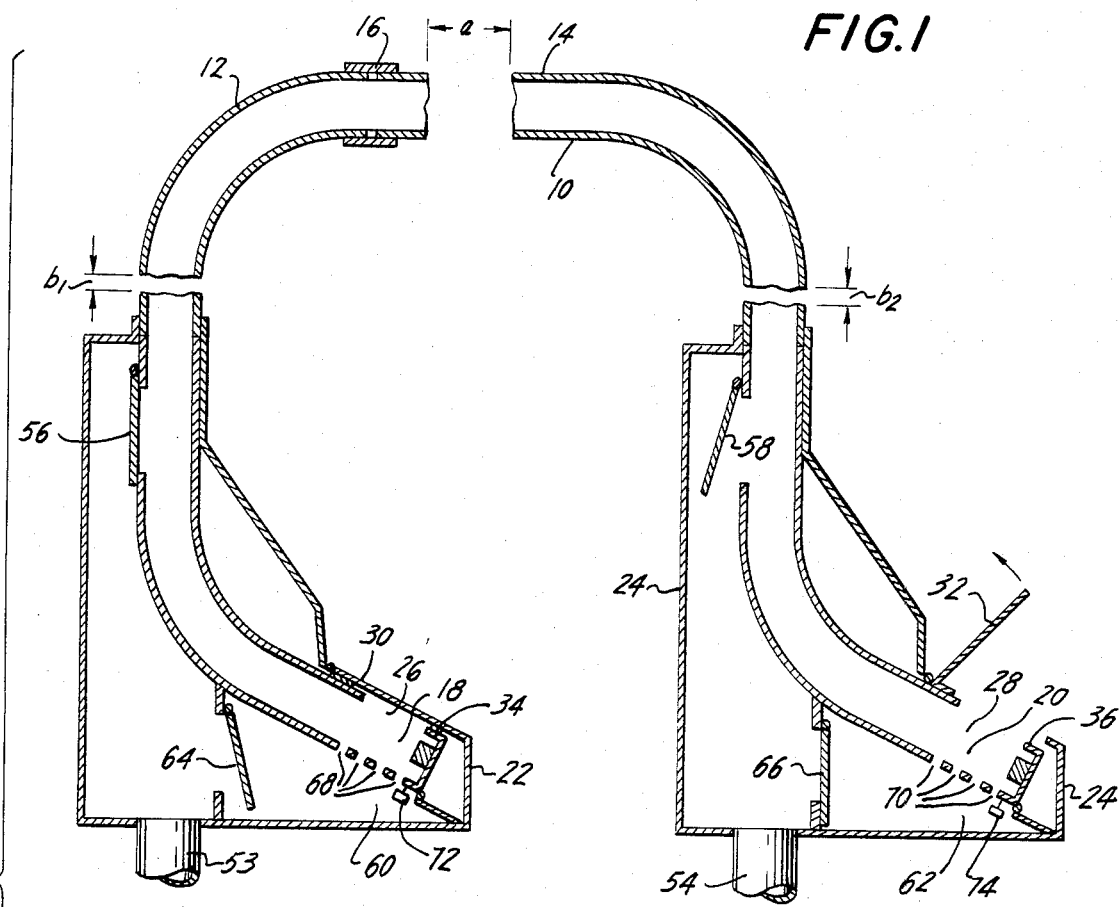
FIG. 1 is a representation, partially in cross-section and partially schematic, of the principal stationary components of the present tube system including the pneumatic means, switching means, conduits and access stations.

The system depicted in FIG. 1 includes conduit 10 which has a uniform cross-section, optionally circular but preferably rectangular or oval. For ease of fabrication and installation, conduit 10 can be constructed from various curved and linear segments 12 and 14, respectively, joined by suitable means such as sleeve 16. The sections of conduit not shown but indicated by a, b1 and b2, can extend over considerable lateral distances, depicted at a, as well as over different vertical distances, depicted at b1 and b2. Each terminus 18 and 20 of conduit 10 is associated with an access station 22 and 24, respectively. Each access station defines a closable opening 26 and 28 which, as described below in greater detail in connection with FIGS. 3A, 3B and 3C, permits access to the carrier associated with the system. Each access station also includes hatch means 30 and 32 which are pivotably mounted and operable to assume open (see access station 24) and closed (see access station 22) positions. Hatch means 30 and 32 include latch 34 and 36 which is releasable upon impact of a carrier arriving at that station but which otherwise retains each hatch in a closed position over the opening in a sufficiently airtight manner as to maintain the pressure differential (pressure or vacuum) required to propel the carrier from one station to the other.

Operably connected to one of access stations 22 or 24 will be pneumatic means suitable to generate alternatively a positive and negative pressure differential sufficient to overcome the frictional and, when applicable, gravitational resistance to movement of the carrier in the system so as to propel the carrier in one of the two possible directions of movement within the system. Although virtually any of the known pneumatic means can be employed, the present system preferably employs a remarkably simple and inexpensive system. Thus pneumatic means 38 comprises at least one pair of opposed electrically powered blowers 40 and 42. Each of these blowers is of the same type and is characterized by having a low resistance to rotation when not electrically activated. As shown in FIG. 1, the blowers are electrically connected through primary switching means 44 which are operable to activate selectively either blower of each pair and deactivate the other blower of that pair. Since blowers 40 and 42 are disposed in series in an opposed fashion, a first blower will provide a pressure differential to the system when activated with the second blower rotating passively, whereas when the second blower is activated and the first deactivated, the opposite pressure differential will be provided to the system. As is discussed below, switching means 44 will include a neutral position to deactivate all blowers in passing from a pressure mode to a vacuum mode and vice versa. The pneumatic means can include additional paired and opposed blowers, such as 46 and 48, which operate in the identical fashion. Pneumatic means 38 will include a vent 50 and butterfly valve 51 to regulate air volume. Appropriate conduiting such as flexible hosing (not shown) connects outlet port 52 to inlet port 53 of one access station. The inlet port 54 of the access station to which the pneumatic means are not directly connected serves as a second vent.

Each of access stations 22 and 24 will include first self-sealing valve means 56 and 58 disposed upstream from the conduit terminus 18 and 20, respectively. A diversion conduit 60 and 62 (which may be defined by separate conduiting or, as shown, by the interior of the access station) communicates pneumatically with terminus 18 and 20 and the respective valve means 56 and 58. Second self sealing valve means 64 and 66 are disposed between the conduit terminus 18 and 20 and inlet ports 53 and 54, respectively. First valve means 56 and 58 are operable to close, as in the case of 56, when the pressure in the diversion conduit 60 is greater than the pressure in the main conduit and to open when the reverse condition obtains. Openings 68 and 70 are defined in each terminus 18 and 20 for pneumatic communication with the diversion conduits 60 and 62. Consequently, when a carrier (not shown in FIG. 1) is at access station 22 with hatch 30 closed and the pneumatic means 38 is in a pressure mode, first valve 56 will be closed whereas second valve 64 will be open. The pressure, communicating through opening 68 thereby propels the carrier from terminus 18 to the region of valve 56. Although valve 56 may open once the carrier has passed this region, there will remain a positive pressure differential between the rear and front of the carrier in the remainder of the system. Conversely, once the carrier passes valve 58 in station 24, the pressure in the main conduit 10 will be greater than that in diversion conduit 62 and valve 58 will open, thereby diverting the flow of air behind the carrier to vent 54. The carrier will continue its movement to terminus 20 as a result of gravity and second valve 66 is forced to a closed position, building a cushion of air to reduce the carrier's speed and reduce its momentum. Upon impact, hatch means 32 will be opened, and secondary switch 74 will be activated, as discussed below. An analogous sequence of valving events occurs in reverse if the carrier is at station 24 and pneumatic means 38 are placed in its vacuum mode.

Figure 2:
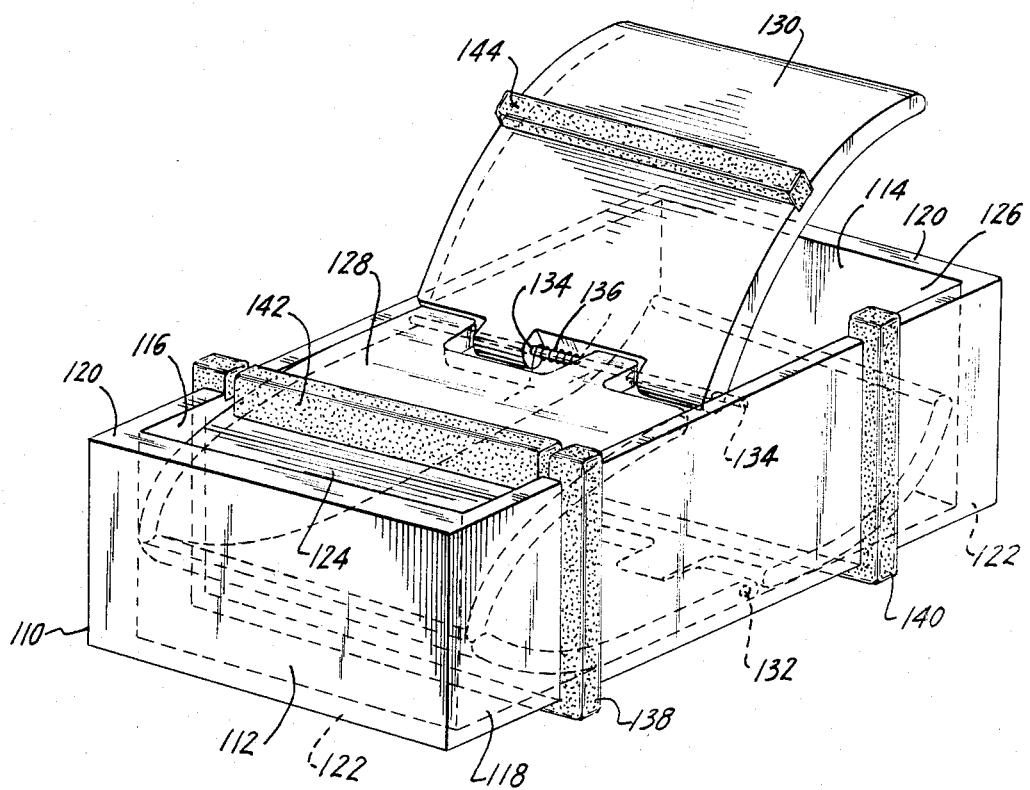
FIG. 2 is a perspective view of the carrier utilized in the system.

Referring now to FIG. 2, the carrier utilized in the present invention comprises a rigid frame 110 defined by spaced end sections 112 and 114, a pair of spaced side members 116 and 118, a top 120 and a bottom 122. When viewed along the axis of the carrier's intended direction of movement in the pneumatic tube, frame 110 complements the cross-section of the pneumatic tube. A pair of doorways 124 and 126 is formed within one or both of the top and an unlatched door 128 and 130 is pivotably mounted in each such doorway for swinging movement between open and closed positions about an axis which is perpendicular to the carrier's intended direction of movement in the pneumatic tube. Pivotable mounting 132 of each door is inwardly disposed from the nearest end section so that each door swings open towards that end section. In the embodiment shown, the pair of doorways 124 and 126 is defined by a common hinge pin 134, disposed centrally on the carrier, each of doors 128 and 130 being pivotably mounted on common hinge pin 134 and constitute the major proportion of the entire top surface. However, top 120 may extend across a larger proportion of the top surface and separate doorways may be defined in the top, each carrying its own pivotable mounting for its associated door.

Although the carrier is fully functional with a single pair of doors, it is preferable in some applications to have a pair of doors on the top and a second pair on the bottom; i.e., four doors. This permits the two access stations to be aligned in the same direction, as in FIG. 1. If aligned in opposite directions; e.g., if access station 24 were rotated 180° about its vertical axis from the position shown in FIG. 1, only one set of doors would be required. Preferably the inner surface of the doors is concave, curving inwardly from its hinged mounting toward the interior of the carrier, so as to facilitate manual removal of items in the carrier; e.g., coins. With four doors, the curve can be such that the edge of a top door most distal from its hinged mounting contacts, when the doors are closed, the corresponding edge of the door mounted at the same end of the carrier but on the bottom.

Spring means 136 are associated with each door and urge the doors to an open position, as shown for door 130. With four doors, it will be appreciated that all doors, being necessarily unlatched, will be open if the carrier is not in the system. The carrier is thus useless when not in the system. However, while in conduit 10 (shown in FIG. 1) the doors are prevented from opening by the restraint of the conduit's inner surface. When positioned under opening 26 or 28, the opening of hatch 30 or 32, respectively, permits the single door of the carrier so aligned with the opening to assume an open configuration, the remaining doors being held in a closed configuration by the interior of the conduit terminus at the access station.

Disposed about the outer perimeter of the carrier (namely across side members 116 and 118 and across doors 128 and 130, as well as across any doors on the bottom) are gasket strips 138, 140, 142 and 144. These insure an airtight seal between the carrier and the conduit sufficient to maintain the pressure differential required to propel the carrier. This seal is improved with regard to strips 142 and 144 since doors 128 and 130 urge the strips toward the conduit's inner surface by reason of the bias of spring means 136.

Figure 3A:
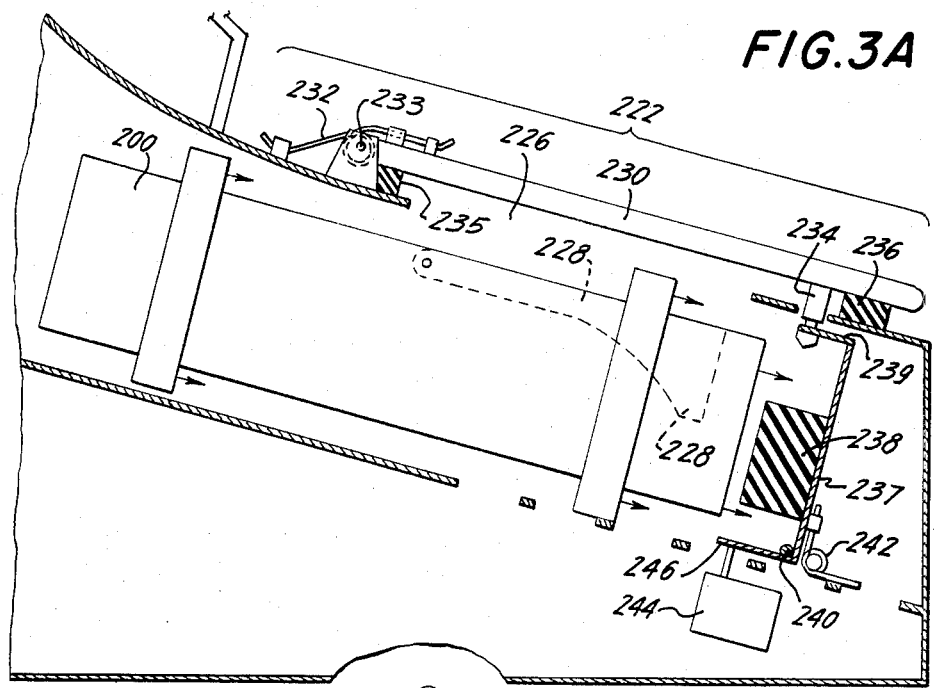
FIGS. 3A, 3B and 3C are partial cross-sections showing the cooperation of the carrier with an access station associated with a terminus of the conduit.
Figure 3B:
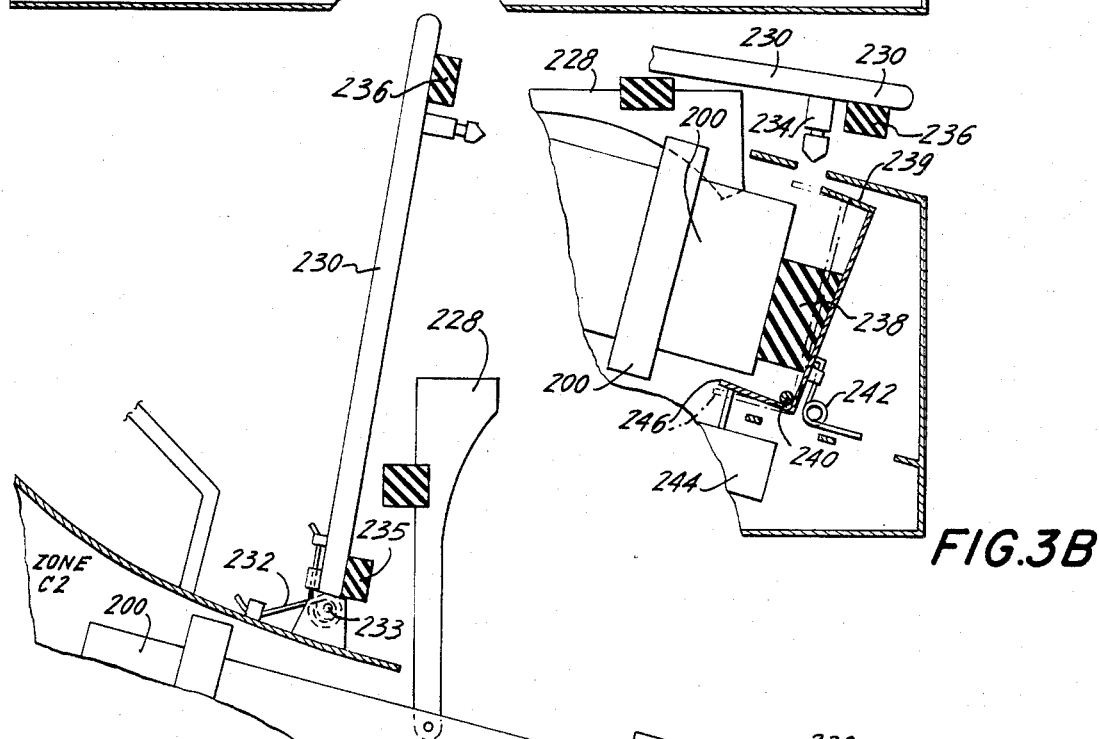
Figure 3C:
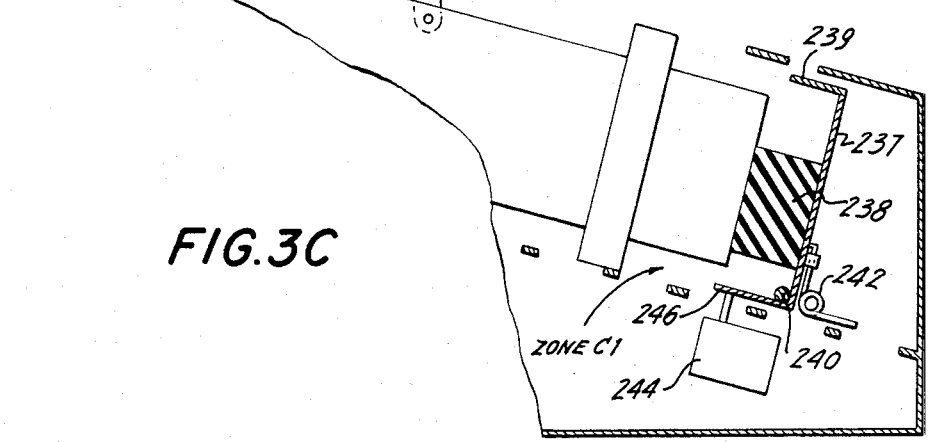

FIGS. 3A, 3B and 3C, when taken together, represent the sequence of events which occurs upon arrival of carrier 200 at conduit terminus 222. Hatch means 230 initially is retained in a closed position by engagement of latch means 234 covering opening 226 in a sufficiently airtight manner (by reason of gasket strips 235 and 236 which line the perimeter of hatch means 230) to maintain the required pressure differential in the system. Carrier 200, falling under the influence of gravity and inertia, approaches cushion 238 which is fabricated from a resilient material such as rubber. Cushion 238 is disposed on conduit end plate 237 which is pivotably mounted within the access station on shaft 240 (bearing not shown). Spring means 242 is biased in the direction of the oncoming carrier and end plate extension 246 depresses secondary switch 244.

Secondary switch 244 communicates with primary switching means 44 (see FIG. 1), each two activations of a secondary switch advancing primary switching means 44 from one mode through neutral to the next mode; i.e., from pressure to neutral and then from neutral to vacuum, or from vacuum to neutral and then from neutral to pressure. The momentum of carrier 200 is absorbed partially by cushion 238 and partially by a deformation of spring 242 upon the pivoting of end plate 237. This pivoting is sufficient for latch plate 239 to release latch 234. Under the bias of hatch spring 232, hatch 230 is urged about pivot 233 to an open position, as shown in FIG. 3C, so that carrier door 228, which is now free from restraint, also opens under the influence of the carrier door spring (not shown in FIGS. 3A-3C).

Simultaneously, the pivoting of end plate 237 causes end plate extension 246 to momentarily release secondary switch 244. The subsequent but almost immediate return of end plate 237 to its orignal position under the bias of spring 242 causes plate extension 246 to depress secondary switch 244. This cycle of secondary switch 244 in turn advances primary switching means 44 (see FIG. 1) to its next position; e.g., if primary switching means 44 has activated the pressure mode as the carrier is propelled from one station to the next, the impact of the carrier on end plate 237 will cause, through the cycling of secondary switch 244, primary switching means 44 to advance to a neutral position.

End plate 237 reassumes its normal position upon the relaxing of spring 242 from its deformation (see FIG. 3C) and latch plate 239 then reassumes a position in which it is operable to engage latch 234 upon a subsequent manual closing of hatch 230. Upon the closing of door 230, end plate 237 will again pivot the latching operation thereby cycling secondary switch 244. The pneumatic means thus are automatically activated. Since the station is now in a relatively airtight condition, the creation of a pressure differential between zones C1 and C2 will initiate propulsion of carrier 200 to the other station. Upon arrival an analogous sequence of events occurs.

Returning to FIG. 1, switching means can take a variety of forms. In the embodiment shown, a pair of two coil multicontact self-holding relays 80 and 81 and 82 and 83 are connected to secondary switches 72 and 74. Relay pairs 80, 81 and 82, 83 in turn activate power relays 86 and 87. Thus if secondary switch 72 is momentarily closed, as for example by the closing of hatch 30, then blowers 42 and 48 are activated (pressure mode). Arrival at conduit terminus 20 in access station 24 will momentarily close secondary switch 74, thereby breaking the circuit to relay 86 through the action of relay pair 80, 81. The subsequent closing of latch 32 again depresses secondary switch 74, causing activation of relay pair 82, 83 and thus of power relay 87, causing blowers 40 and 46 to begin operation (vacuum mode) and thus propelling the carrier from terminus 20 to terminus 28 as already described.

It will be apparent that the particular circuitry shown is not critical and the same sequence of events can be effected with alternative switching means, as for example stepping switches or solid state circuits.

From the foregoing, it will be seen that the present system utilizes a captive carrier which is simple and inexpensive to manufacture and, lacking all complex mechanism, is extremely sturdy. Moreover, the overall system requires no complex pneumatic valves. The entire operation is virtually automatic, the transport of the carrier being activated simply by the closing the hatch. In fact the system is not "on" unless both hatches are closed. In addition, the minimal requirements of the electrical components in the access stations (e.g., secondary switches 72 and 74 in FIG. 1 and 244 in FIGS. 3A-3C), permit the use of low voltage to effect switching, a further safety consideration of considerable importance when the system is utilized in areas having potentially explosive vapors; e.g. refineries and gas stations.

It is apparent that numerous variations in the device are possible without departing from the basic nature of the invention, which invention is defined solely by the claims which follow.

What is claimed is:

1. A carrier for a pneumatic tube system comprising a rigid frame defining a single undivided chamber, said frame comprising spaced end sections, a pair of spaced side members, a top, and a bottom, said frame when viewed along the axis of the carrier's intended direction of movement in the pneumatic tube substantially complementing the cross-section of the pneumatic tube, a pair of doorways formed on at least one of the top or bottom, a door pivotably mounted in each of the doorways for swinging movement between open and closed positions about an axis which is perpendicular to the carrier's intended direction of movement in the pneumatic tube, said doors being free of latching means with the pivotal mounting of each door being inwardly disposed from the end sections of the frame so that in opening each door freely swings away from one end section, and spring means associated with each door and urging the door to assume an open position when the door is not confined by said pneumatic tube system.

2. A carrier according to claim 1 wherein gasket material operable to frictionally engage the interior of the tube system is disposed about the outer perimeter of the carrier across the side members and across the doors.

3. A carrier according to claim 2 wherein adjacent edges of each pair of doorways are defined by a common hinge pin disposed centrally on the carrier between said side members, each of said doors being pivotably mounted on said common hinge pin.

4. A carrier for a pneumatic tube system comprising a rigid frame defining a single undivided chamber, said frame comprising spaced end sections, a pair of spaced side members, a top, and a bottom, said frame when viewed along the axis of the carrier's intended direction of movement in the pneumatic tube substantially complementing the cross-section of the pneumatic tube, a first pair of doorways formed on the top of the frame with a door pivotably mounted in each doorway for swinging movement between open and closed positions about an axis which is perpendicular to the carrier's intended direction of movement in the pneumatic tube, and a second pair of doorways formed on the bottom of the frame with a door pivotably mounted in each doorway for swinging movement between open and closed positions about an axis which is perpendicular to the carrier's intended direction of movement in the pneumatic tube, all of said doors being free of latching means with the pivotal mounting of each door being inwardly disposed from the end sections so that in opening each door freely swings away from one end section, and spring means associated with each door and urging each door to assume an open position when the door is not confined by said pneumatic tube system.

5. A carrier according to claim 4 wherein the adjacent edges of each pair of doorways on the top are defined by a first common hinge pin disposed centrally on the carrier between said side walls, each of the doors associated with the top being pivotably mounted on said first common hinge pin, and the adjacent edges of each pair of doorways on the bottom are defined by a second common hinge pin disposed centrally on the carrier between said side walls, each of the doors associated with the bottom being pivotbly mounted on said second common hinge pin.

6. A carrier according to claim 5 wherein the inner surface of each door is concave, curving inwardly from its hinged mounting towards the interior of the carrier.

7. A carrier according to claim 6 wherein that edge of each top door most distal from the hinged mounting contacts the corresponding edge of the bottom door at the same end of the carrier when said top and bottom doors are retained in their closed configuration.

8. A pneumatic tube system comprising (1) an elongated main conduit of uniform cross-section;
(2) a carrier comprising a rigid frame defining a single undivided chamber, said frame comprising spaced end sections, a pair of spaced side members, a top and a bottom, the height and width of said carrier substatially complementing the cross-section of said conduit, a pair of doorways formed on at least one of the top and bottom, a door pivotably mounted in each of the doorways for swinging movement between open and closed positions about an axis which is perpendicular to the carrier's intended direction of movement in the conduit, said doors being free of latching means with the pivotal mounting of each door being inwardy disposed from the end sections of the frame so that in opening each door freely swings away from one end section, and spring means associated with each door and urging the door to assume an open position when the door is not confined by said pneumatic tube system;
(3) an access station associated with each terminus of the conduit, each station defining a closable opening of such dimensions as to permit one of said carrier doors to assume an open position upon the carrier reaching a terminus of the conduit with which that station is associated but insufficient to permit removal of the carrier from the system;
(4) pneumatic means communicating with said conduit at at least one of said stations and operable to act in either a pressure mode or a vacuum mode, each mode being of sufficient magnitude to propel said carrier through said system from one station to the other; and
(5) primary switching means operable to switch said pneumatic means between said pressure mode and vacuum mode.

9. A pneumatic tube system according to claim 8 wherein each access station includes pivotably mounted hatch means operable when open to permit a carrier door to open and when closed to cover said opening in a sufficiently airtight manner as to maintain a pressure differential in the system at least sufficient to propel the carrier therein.

10. A pneumatic tube system according to claim 9 wherein said access station includes latch means operable to retain said hatch means in said closed position when said station is vacant, said latch means being mechanically responsive to and releaseable upon the impact of the carrier arriving at said station.

11. A pneumatic tube system according to claim 10 wherein said latch means includes a displaceable latch plate associated with the terminus of said conduit, said latch plate being momentarily displaceable upon impact of a carrier at that terminus, and a latch engagable with said latch plate is disposed on said hatch means, said latch being disengagable from said latch plate upon said displacement of the latch plate.

12. A pneumatic tube system according to claim 11 including secondary switch means responsive to displacement of said latch plate and operable to activate said primary switching means.

13. A pneumatic system according to claim 8 wherein the pneumatic means include at least one pair of serially disposed opposed electrically powered blowers pneumatically communicating with one of said access stations, each blower having a low resistance to rotation when not electrically activated, and said primary switching means are operable to activate one or the other blower of each such pair and deactivate the other blower of the same pair.

14. A pneumatic tube system according to claim 8 and comprising
(1) an elongated main conduit of uniform cross-section;
(2) a carrier comprising a rigid frame defining a single undivided chamber, said frame comprising spaced end sections, a pair of spaced side members, a top, and a bottom, the height and width of said carrier substantially complementing the cross-section of said conduit, a pair of doorways formed on at least one of the top and bottom, a door pivotably mounted in each of the doorways for swinging movement between open and closed positions about an axis which is perpendicular to the carrier's intended direction of movement in the conduit, said doors being free of latching means with the pivotal mounting of each door being inwardly disposed from the end sections of the frame so that in opening each door freely swings away from one end section, and spring means associated with each door and urging the door to assume an open position when the door is not confined by said conduit;
(3) an access station associated with each terminus of the conduit, each station defining an opening of such dimensions as to permit one of said carrier doors to assume an open position upon the carrier reaching a terminus of the conduit with which that station is associated but insufficient to permit removal of the carrier from the system, said access station including a pivotably mounted hatch operable when open to permit said one carrier door to open and when closed to cover said opening in a sufficiently airtight manner as to maintain a pressure differential in the system at least sufficient to propel the carrier therein, spring means urging said hatch to an open position, a latch operable to retain said hatch in said closed position when said station is vacant, and latch releasing means mechanically responsive to the impact of the carrier arriving at said station;
(4) pneumatic means communicating with said conduit at at least one of said stations and operable to act in either a pressure mode or a vacuum mode, each mode being of sufficient magnitude to propel said carrier through said system from one station to the other; and
(5) primary switching means operable to switch said pneumatic means between said pressure mode and vacuum mode.

* * * * *